(12) United States Patent
Addanki et al.

(10) Patent No.: US 8,830,825 B2
(45) Date of Patent: Sep. 9, 2014

(54) METHOD AND SYSTEM FOR PRIORITY BASED (1:1)ⁿ ETHERNET PROTECTION

(75) Inventors: Venkata Ramana Kiran Addanki, Sunnyvale, CA (US); Arun Saha, Fremont, CA (US); Mandar Joshi, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 604 days.

(21) Appl. No.: 13/101,615

(22) Filed: May 5, 2011

(65) Prior Publication Data

US 2012/0281525 A1   Nov. 8, 2012

(51) Int. Cl.
  *G06F 11/00* (2006.01)
  *H04L 12/56* (2006.01)

(52) U.S. Cl.
  CPC ............ *H04L 49/557* (2013.01); *H04L 49/351* (2013.01)
  USPC ........... 370/225; 370/228; 370/242; 370/245; 370/248

(58) Field of Classification Search
  USPC .......................... 370/225, 228, 242, 245, 248
  See application file for complete search history.

(56) References Cited

U.S. PATENT DOCUMENTS

| | | | | |
|---|---|---|---|---|
| 5,933,422 | A * | 8/1999 | Kusano et al. ................. | 370/331 |
| 6,363,319 | B1 * | 3/2002 | Hsu ................................ | 701/533 |
| 6,859,431 | B1 | 2/2005 | Tedijanto et al. ............. | 370/223 |
| 7,126,908 | B1 | 10/2006 | Lu et al. ......................... | 370/228 |
| 7,206,281 | B2 | 4/2007 | Chen et al. ..................... | 370/222 |
| 7,535,831 | B2 * | 5/2009 | Phelps et al. ................... | 370/228 |
| 2003/0063560 | A1 * | 4/2003 | Jenq et al. ..................... | 370/216 |
| 2004/0179472 | A1 * | 9/2004 | Khalilzadeh et al. ......... | 370/227 |
| 2005/0237984 | A1 * | 10/2005 | Benveniste .................... | 370/338 |
| 2006/0002292 | A1 * | 1/2006 | Chang et al. .................. | 370/225 |
| 2008/0259786 | A1 * | 10/2008 | Gonda .......................... | 370/218 |
| 2009/0232148 | A1 * | 9/2009 | Endo et al. ..................... | 370/401 |
| 2010/0290340 | A1 * | 11/2010 | Lee et al. ....................... | 370/225 |
| 2010/0312878 | A1 * | 12/2010 | Vladescu et al. ............. | 709/224 |
| 2012/0017110 | A1 * | 1/2012 | Omar ................................ | 714/2 |
| 2012/0236710 | A1 * | 9/2012 | Tochio ........................... | 370/228 |

OTHER PUBLICATIONS

International Telecommunication Union; "Generic Protection Switching—Linear Trail and Subnetwork Protection"; Series G: Transmission Systems and Media, Digital Systems and Networks; G.808.1; pp. 34, Feb. 2010.
International Telecommunication Union; "Ethernet Pprotection Switching"; Series G: Transmission Systems and Media, Digital Systems and Networks; Series Y: Global Information Infrstructure, Internet Protocol Aspects and Next-Generation Networks; G.8031/Y.1342; pp. 41, Jun. 2006.
BTI Systems—White Papers; "Service Restoration in Switched Ethernet Networks"; pp. 8, 2009.

* cited by examiner

*Primary Examiner* — Farah Faroul
(74) *Attorney, Agent, or Firm* — Baker Botts L.L.P.

(57) ABSTRACT

A method for priority-based protection includes assigning a priority to each of a plurality of flows associated with a plurality of working paths, wherein each of the plurality of the flows has a unique priority. The method also includes determining that one or more of the working paths has failed, and determining the available bandwidth on a protection path upon the failure of the one or more of the working paths. In addition, the method includes determining the priority of the flows on the one or more failed working paths, and switching two or more flows from the one or more failed working paths to the protection path based on at least the priority of the two or more flows, the bandwidth of the working path and the available bandwidth on the protected path.

17 Claims, 10 Drawing Sheets

METHOD AND SYSTEM FOR PRIORITY BASED $(1:1)^n$ ETHERNET PROTECTION

TECHNICAL FIELD OF THE DISCLOSURE

The present disclosure relates generally to Ethernet networks and, more particularly, to a method and system to protect several working Ethernet flows that have a common protection path by assigning priority to each of the working flows.

BACKGROUND

Telecommunications systems and data communication networks use Ethernet networks to rapidly convey large amounts of information between remote points. In an Ethernet network, information is conveyed in the form of frames through fiber optic electrical connections, for example. Ethernet networks can be used to implement Local Area Networks (LANs). Virtual Local Area Networks (Vans) can group, physically disparate network elements together to operate with a common set of requirements as if they were attached to the same domain.

An Ethernet network handles a large amount of data from multiple points in the network. The bandwidth of a network is finite and determines the amount of data that can be communicated at any given time. Common issues with networks are loss of data or connection due to a line failure. For example, a service provider may experience disruptions in data transmission or slow downs of data transmission to multiple clients. The disruption of data flow may impact business costs due to lost working time. As technology continues to improve, clients expect a high level of service and minimal loss of data.

A current solution to the issues of lost data and the need for a higher level of service is to provide an alternate path, called a protection path, that is available for re-routing data when there is a failure in the primary path, called a working path.

Disadvantages of the protection path are inefficient use of network bandwidth, lack of predictability of which data path or flow will be on the protection path during a multiple fail scenario, no opportunities to optimize bandwidth of the network, and limited ability of service providers to offer improved service level agreements (SLA).

SUMMARY

In accordance with a particular embodiment of the present disclosure, a method and system for priority based Ethernet protection is presented. The method and system may include protecting multiple working Ethernet flows which share a common protection path by assigning a priority to each of the working flows on each of the working paths. The method and system may further include determining the available bandwidth on a protection path upon failure of the working paths. The method and system may additionally include determining the priority of the flows on the failed working paths. Moreover, the method and system may include switching two or more flows to the protection paths based at least on the priority of the flows, the bandwidth of the flows in the working path and the available bandwidth on the protection path.

Technical advantages of one or more embodiments of the present disclosure may include the ability to assign priorities to flows associated with the working paths of Ethernet connections. If service providers or IT departments can assign priorities to the flows, then during multiple working path failure conditions there will be no interruptions of critical data transmissions.

Technical advantages of one or more embodiments of the present disclosure may also include the ability to service multiple working path failures. In particular embodiments, if the bandwidth of the protection path is sufficient, the traffic on more than one path can be assigned to the protection path during multiple failure conditions. The priority of the flow and its associated bandwidth may determine whether the flow on the failed working path will be switched to the protection path. Also, having the flows of multiple failed working paths switched to the protection path may also allow for optimization of bandwidth usage.

Technical advantages of one or more embodiments of the present disclosure may also allow for an improved business model and level of service for clients. A service provider may be able to offer multiple levels of service through assigning priorities to flows and servicing multiple working path failures. They may be able to charge clients for this higher level of service and a service provider could see increased profits and clients could ensure a certain level of service. In addition, in an office environment, critical data systems would receive uninterrupted service.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
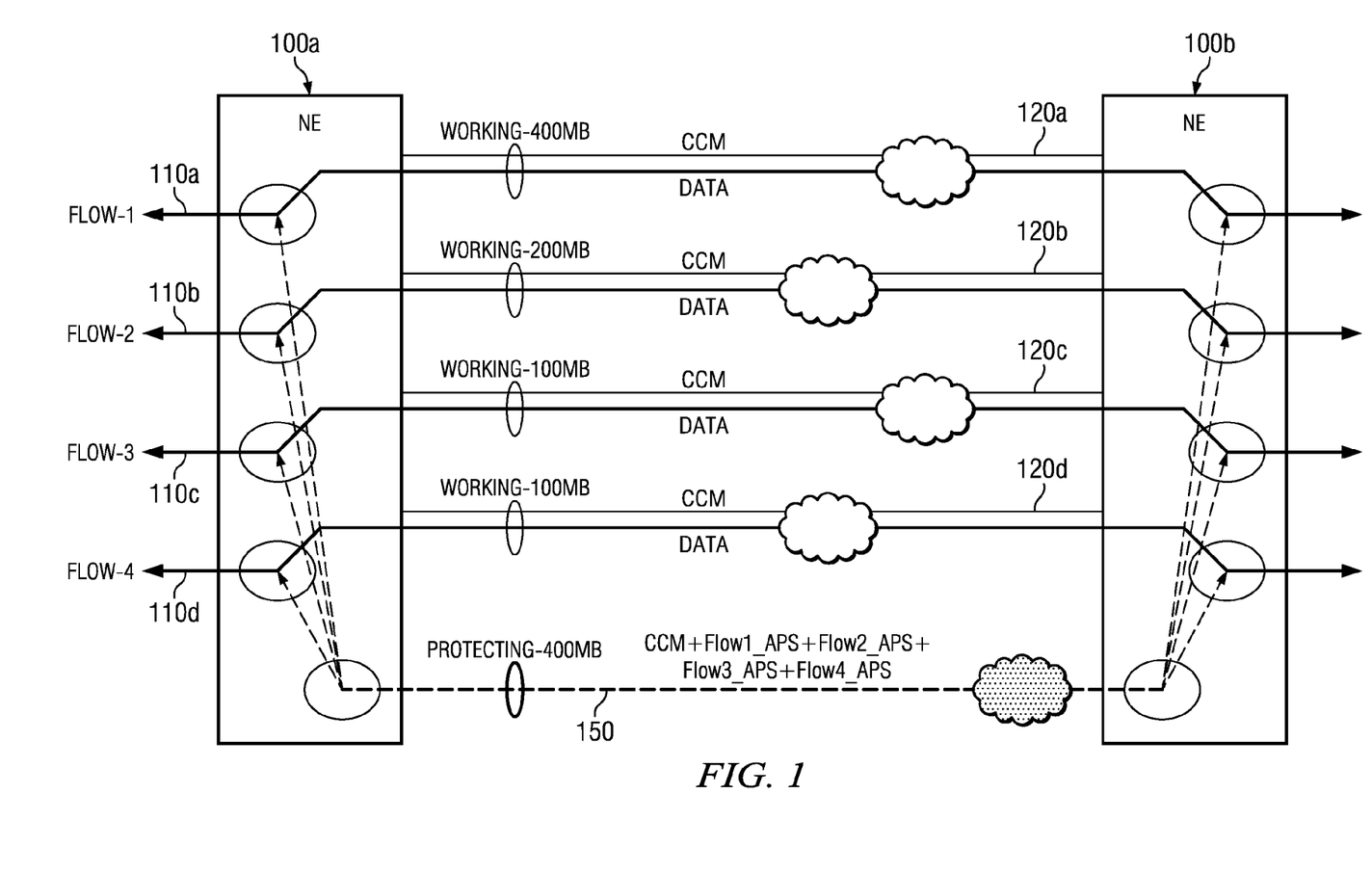
FIG. 1 is a block diagram illustrating a $(1:1)^n$ protection architecture in a network.

FIG. 1 is an example of a current (1:1)" protection architecture in a network as described in the ITU-T G808.1 specification. A network may include a plurality of network elements configured to transmit data on a plurality of working paths coupled to the network elements. In certain embodiments, the network includes network elements or nodes 100 that are communicatively coupled via working paths 120 and protection path 150. However, any suitable configuration of any suitable number of network elements 100 may create the network. The network elements 100 may be located in similar or geographically disparate locations. Although the network is shown as a logical point-to-point network, the network may also be configured as a ring network, mesh network, or any other suitable network or combination of networks.

Network elements may be coupled via optical fiber, an Ethernet cable, a WiFi signal, or other suitable medium. Network elements 100a and 100b may exchange data transmissions (flows), Continuity Check Messages (CCM) and Automatic Protection Switching (APS) signals. CCMs are uni-directional, broadcast messages that provide a means to check connectivity of paths in a network. Each working path and protection path has a unique CCM signal between network elements 100. The APS signal is a frame that contains information specific to the protection scheme and to switching data from the working path to the protection path. The APS signal may be transmitted periodically on the protection path 150 during normal operation. When a working path failure occurs, the APS frame may be immediately transmitted between the network elements bounding the path. When there is a need to switch a flow 110 from a working path 120 to a protection path 150, the APS frame may perform the handshaking between network elements 100. In addition, each working path has an associated flow. Flows 110 are the traffic or data transmitted on the working paths 120 and protection path 150. Such traffic may comprise optical or electrical signals configured to encode audio, video, textual, and/or any other suitable data. In addition, each working path has a finite bandwidth. In the current example, working path 120a has 400 MB, working path 120b has 200 MB, working path 120c has 100 MB and working path 120d has 100 MB. Protection path 150 has a bandwidth equal to the bandwidth of the largest working path bandwidth that it is protecting. In this example, the protection path 150 has bandwidth of at least 400 MB, which is the bandwidth of highest bandwidth working path 120a. However, the bandwidth of each working path and the protection path may be any value suitable to meet the data transmission needs. Additionally, in the network, only one working path may be protected at a time. In the case of multiple working path failures, certain flows will not be protected.

Figure 2:
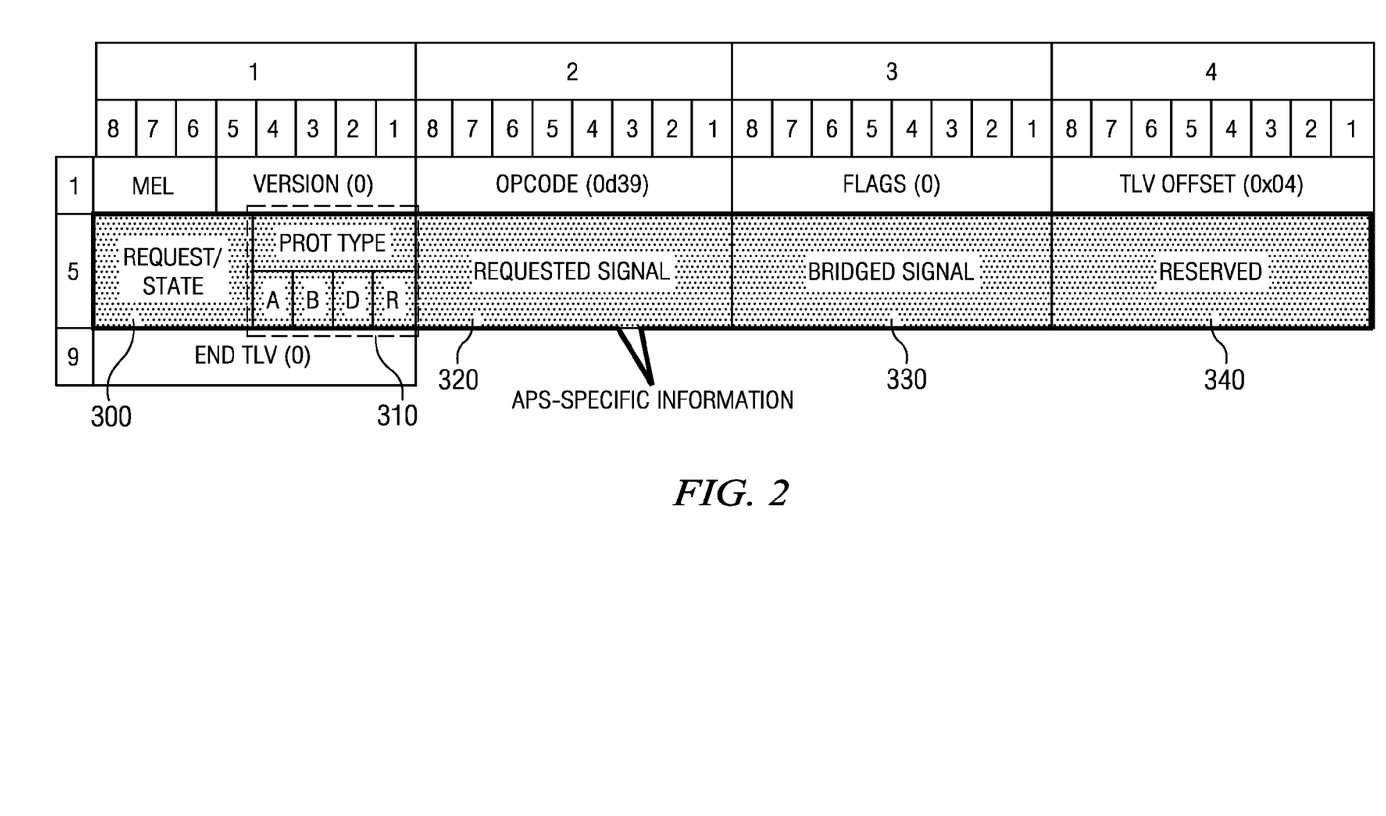
FIG. 2 is an illustration of the Automatic Protection Switching (APS) Frame used in the protection architecture of FIG. 1.

FIG. 2 is an illustration of the Automatic Protection Switching (APS) Frame for current protection schemes. Automatic Protection Switching is described in the ITU-T G.8031 specification and further defined in Telcordia GR-253. The ITU-T G.808.1 specification defines a required communication channel called the protection path or protection flow between two network elements. It is separate from the working entity or path and is used to synchronize the two network elements defining the boundaries of the protection path. In the frame shown in the example, the APS specific information is the following: Request/State 300, Protection Type 310, Requested Signal 320 and Bridged Signal 330 as defined in the ITU-T G.8031 specification. There is also a Reserved Field 340 that is not currently defined in the ITU-T G.8031 specification. The Request/State 300 is a four bit field which indicates the type of request in the switching algorithm. For example, the Request/State 300 may be "Forced Switch" as indicated by 1101 in the field or "Wait to Restore" as indicated by 0101 in the field. The Protection Type 310 designates A, B, D or R which are defined as follows: A=APS or not, B=1:1 or 1+1 protection algorithm, D=bi-directional or uni-directional protection paths and R=revertive or not revertive. The Protection Type 310 (A and B bits) indicates to the network if Automatic Protection Switching is active and what type of protection scheme is active. The D bit provides further detail so that the network elements 100 know whether the data flow switched to the protection path is uni-directional or bi-directional. The Requested Signal 320 indicates the request by the near end node to be switched over to the protection path. The Bridged Signal 330 indicates that the signal is switched by the near end node over the protection path. The Requested Signal 320 and the Bridged Signal 330 allow the network elements 100a and 100b to remain synchronized when switching a flow from a failed working path to the protection path.

For example, in the current protection scheme as described in FIGS. 1 and 2, if a connectivity failure was detected via the CCM signal on a working path, the APS mechanism may activate. An APS frame may be sent between network elements 100 to ensure that each node agrees to switch the traffic or flow from the working path failure to the protection path. For example, network element 100a may send an APS frame to network element 100b that has the "Requested Signal" 320 bit set. Network element 100b receives the APS frame and returns an APS frame with the "Requested Signal" 320 bit set. Network element 100a responds with another APS frame with both the "Requested Signal" 320 and the "Bridged Signal" 330 set. Network element 100b receives the frame and responds with an APS frame with the same bits set. With the appropriate bits in the APS frame set, the network elements 100 are in agreement and the data switch occurs. The CCM signal for the working path with a failure may continue to be monitored. Once the CCM signal restores, a "Wait to Restore" will be set in the APS frame "Request/State" 300 field and the process described above may be repeated but the bits may be un-set instead of set.

Figure 3:
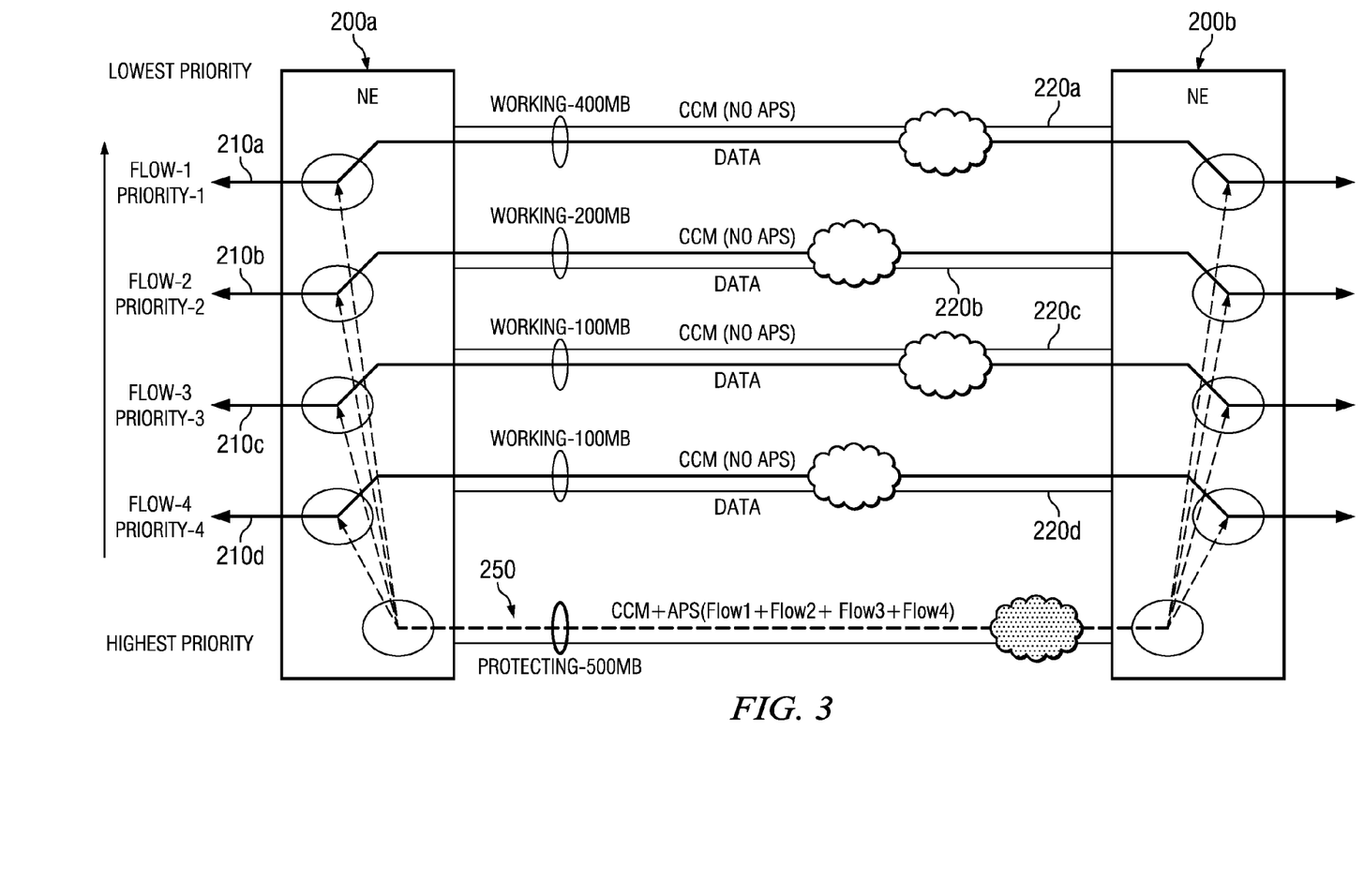
FIG. 3 is a block diagram illustrating an embodiment for a priority based $(1:1)^n$ protection scheme in a network, according to a particular embodiment of the present disclosure.

FIG. 3 is a block diagram illustrating an embodiment for a (1:1)" priority based protection scheme in a network. In the example scheme, multiple working paths may be protected and unique priorities may be assigned to the flows associated with each working path. The network is communicatively coupled via working paths 220 and protection path 250 through network elements 200. In some embodiments, the working paths grouped with a particular protection path may be defined in the software of network elements 200. In other embodiments the working paths grouped with a particular protection path may be defined in hardware of network elements 200. Flows 210 are the data transmitted on the working paths 220. The working paths 220 in FIG. 3 have a finite bandwidth and the flows 210 have a unique priority. In the example embodiment, working paths 220 have the following bandwidth and priority: working path 220a has 400 MB and Priority 1, working path 220b has 200 MB and Priority 2, working path 220c has 100 MB and Priority 3, and working path 220d has 100 MB and Priority 4. Protection path 250 may have a bandwidth greater than or equal to the sum of the bandwidth of the largest working path bandwidth that it is protecting and the APS frame bandwidth. In this example, the protection path 250 has a bandwidth of 500 MB which is greater than the 400 MB bandwidth of working path 220a. In general, the protection path bandwidth may be greater than or equal to the bandwidth of the largest working path.

The network elements 200a and 200b shown in FIG. 3 may be located in similar or geographically disparate locations. The network elements 200a and 200b may also define the boundaries of the protection path. Network elements 200 may be a switch with a single network card or a distributed switch with multiple network cards. The network cards in network elements 200 may have Ethernet ports and processing resources. Within the processing resources of network elements 200, the configuration of the network may be defined. Each network element may have the working paths and the protection path defined as well as the bandwidth of each path stored. Also an APS State Machine Module (SMM), a Configuration Module and a Flow Admission Module (FAM), not explicitly shown, may be present on the processing resources within the network elements. The APS State Machine Module (SMM) and Flow Admission Module (FAM) are the mechanism for supporting traffic switching from the working path to the protection path. The Configuration Module assigns the priority of the flow on the working path. The SMM is the state machine that facilitates sending the APS frame between network elements negotiating a switch to the protection path. The FAM tracks the status of the protection path in terms of priority and bandwidth and stores the bandwidth of the working paths grouped with the protection path. The FAM may be similar to a Connection Admission Control (CAC) algorithm that determines whether connections should be allowed based on sufficient resource availability. These modules assess the bandwidth and priority and control the switching of the flow(s) 210 from the failing working path(s) 220 to the protection path 250. In addition, in this embodiment, the FAM and SMM may facilitate protecting more than one working path at a time. When there are multiple working path failures, for example, assigned priorities and available/required bandwidth may be used as decision criteria in the FAM when deciding which flow to protect. When multiple failures occur during the same time period, the flows 210 from the working paths 220 may be admitted to the protection path 250 in decreasing order of priority. If the bandwidth of the protection path 250 is fully utilized, the priority of the flow from the newly failed working path 220 may be used to pre-empt existing lower priority flows on the protection path 250. When a working path 220 with the higher priority flow is restored, then the lower priority flow from working paths 220 with the failure will be given an opportunity to have the flow 210 be admitted on to the protection path 250, provided the required bandwidth is available. Once the SMM has determined the traffic to allow on the protection path, the SMM will initiate APS frames to begin the switch of flows 210 from the failed working path 220 to the protection path 250. This will be described in further detail in the descriptions of the Figures below.

Also shown in FIG. 3, the working paths 220 may have a Continuity Check Message (CCM) to indicate current status. The CCM is a standard Ethernet mechanism as described in IEEE 802.1ag that detects and signals connectivity failures, as described in FIG. 1. For example, the CCM signal may be monitored and generated by a Fault Detection Module (FDM), not explicitly shown, that may be present on the processing resources of the network elements 200. A CCM signal may be broadcast, as an example, at a periodic rate of 3.3 ms. The CCM may be monitored to determine if a flow 210 needs to be switched to the protection path 250. A failure of the CCM signal may be defined as a minimum of three missed CCM broadcasts. The APS signals for each working path 220 are transmitted by the APS State Machine Module (SMM) on the protection path 250 when their associated working path has failed. The APS signals in the example embodiment are based on the ITU-T G.8031 specification, as illustrated in FIG. 2. In the example embodiment, the standard APS signal may be augmented to include information that creates an Flow Identifier (Flow ID) for a flow associated with a particular working path, as described below in conjunction with FIG. 4. The APS frame for each flow 210 is transmitted on the protection path 250.

Figure 4:
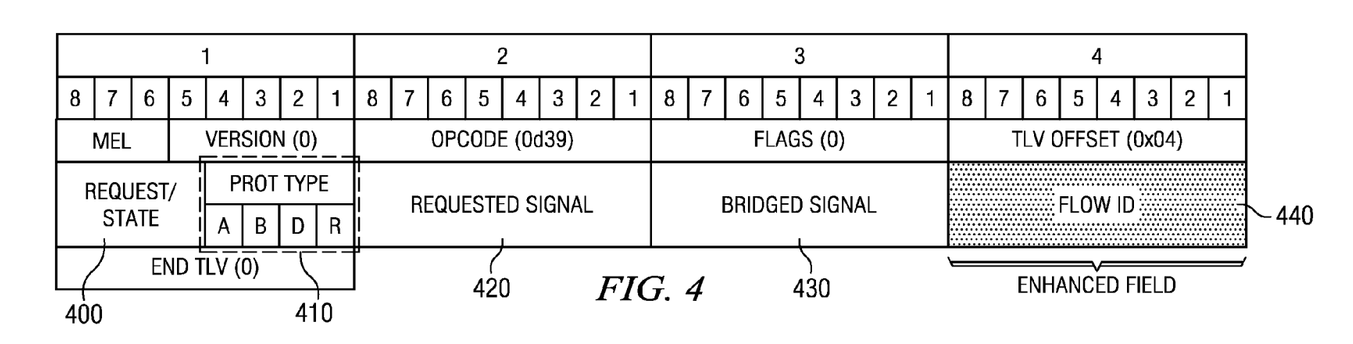
FIG. 4 is an illustration of an example APS Frame for according to a particular embodiment of the present disclosure.

FIG. 4 is an illustration of an example APS frame, according to a particular embodiment of the present disclosure. The 4th byte in the APS specific information may be used to carry the Flow ID 440 to represent a specific flow. The Flow ID 440 may also be used to define the priority of the flow. To achieve priority based $(1:1)^n$ architecture for a network, the following fields in the APS specific section of the frame may be set to the following for the Protection Type 410: A=APS, B=1:1, D=Bi-directional, R=Revertive. The A bit shows that the APS mechanism will be used in the protection scheme (1:1) as indicated in bit B. The D bit set as bi-directional indicates that a working path failure will have both directions of data flow switched to the protection path. The R bit indicates that if a flow is present on a protection path, it will return to the working path if the path is restored. The Requested Signal 420 and the Bridged Signal 430 may be a 0 or 1 to indicate a request and a transition to the protection path. These two bits may be used as a handshaking mechanism to allow to nodes of a network to negotiate switching a flow from the working path to the protection path.

Figure 5:
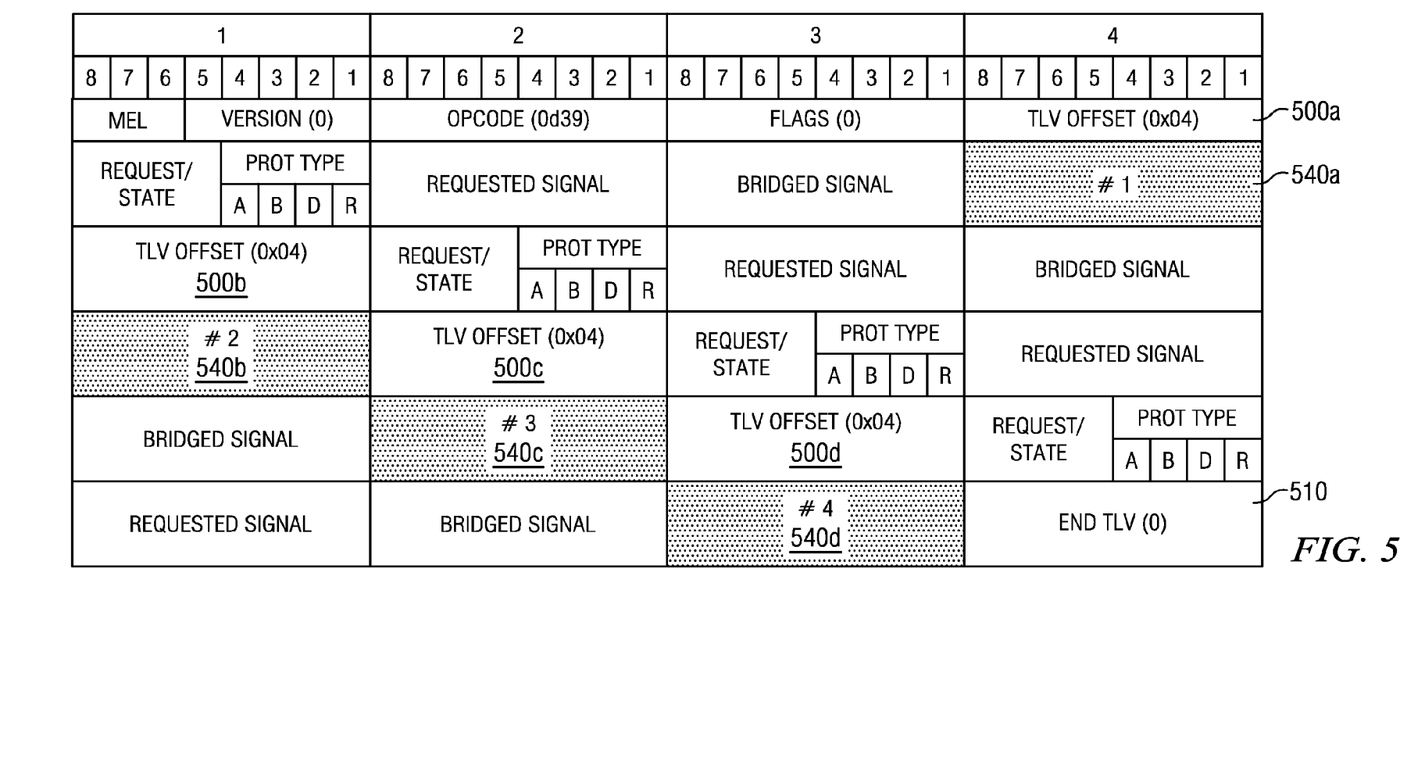
FIG. 5 is an illustration of another example APS Frame according to a particular embodiment of the present disclosure.

FIG. 5 is an illustration of the APS Frame for communicating APS information for multiple flows, according to a particular embodiment of the present disclosure. If the Type-Length-Value (TLV) Offset 500 and End TLV 510 portion of the frame is utilized, then multiple APS signal information may be transmitted together on the protection path to facilitate multiple flows sharing a protection path. The TLV Offset 500 separates the APS frames for a specific flow. Within each APS frame the Flow ID 540 may identify the flow associated with this frame. The End TLV 510 field indicates that end of the grouping of APS frames. In the embodiment shown in FIG. 5, four working paths share a protection path. The APS signals associated with each flow may be transmitted periodically on the protection path. When a working path fails, the APS frame associated with its flow may have the appropriate bits set to begin the handshake mechanism between network elements. The non-failing working path APS frames may be unaffected.

Figure 6:
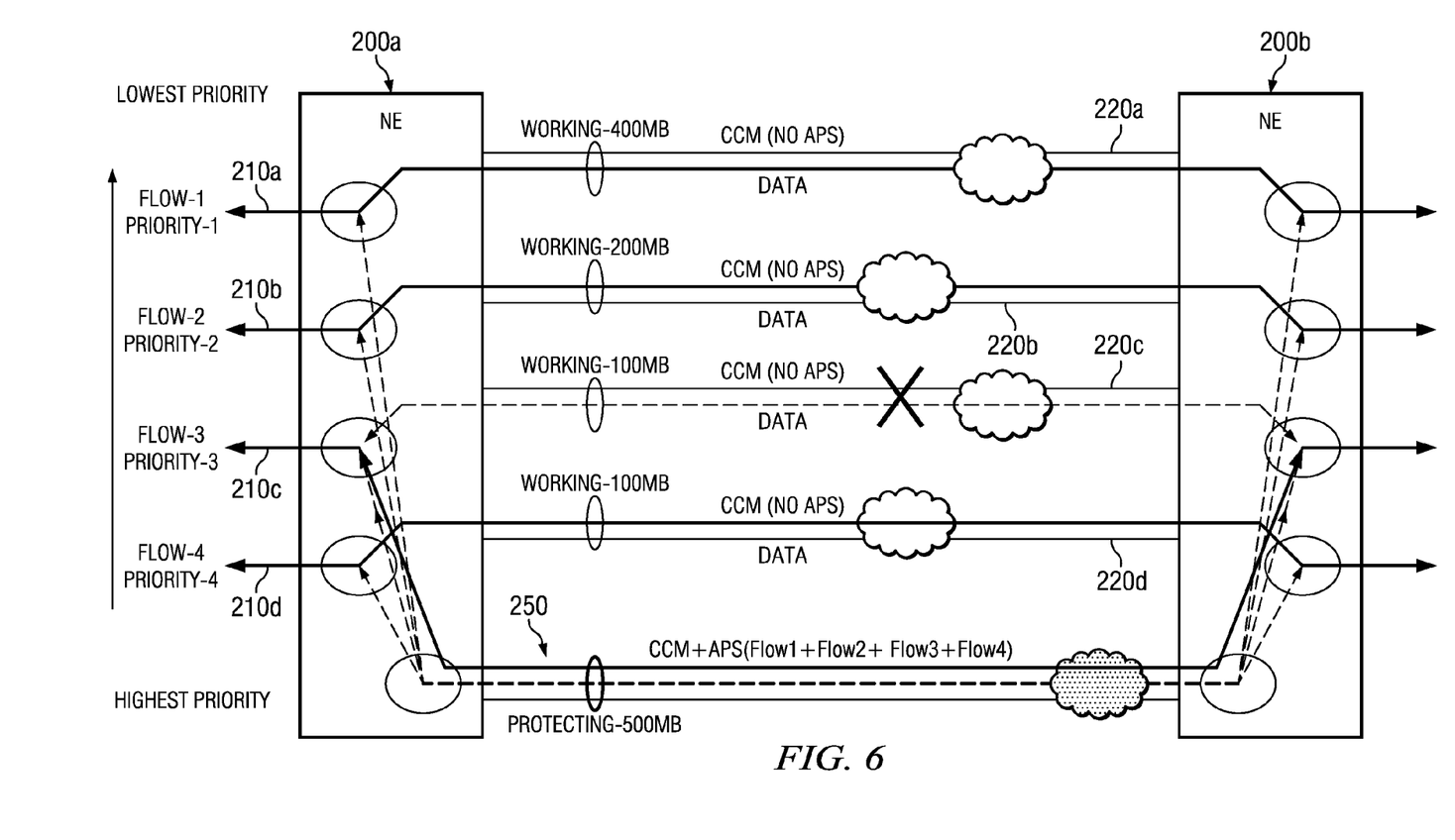
FIG. 6 is a block diagram illustrating an example of the network of FIG. 3 when a single working path fails, according to a particular embodiment of the present disclosure.

FIG. 6 is a block diagram illustrating an example of the network of FIG. 3 when a single working path fails according to a particular embodiment of the present disclosure. In this example, a failure occurs in working path 220c as indicated by a loss of CCM signal. The APS mechanism in the SMM is activated and communicates with the FAM to determine if there is bandwidth available. The FAM determines that working path 220c has 100 MB of bandwidth. Since this is less than the 500 MB bandwidth of the protection path and no other traffic is on the protection path, the FAM allows the flow 210c from working path 220c to switch to the protection path 250 regardless of the priority reflected in its APS signal. The FAM communicates to the SMM that the switch may occur. The SMM sends an APS frame from network element 200a to network element 200b that has the "Requested Signal" bit set. Network element 200b receives the APS frame and returns an APS frame with the "Requested Signal" bit set. Network element 200a responds with another APS frame with both the "Requested Signal" and the "Bridged Signal" set. Network element 200b receives the frame and responds with an APS frame with the same bits set. With the appropriate bits in the APS frame set, the network elements 200 are in agreement and the data switch occurs. Now the available bandwidth on the protection path 250 is 400 MB. In this embodiment, the protection scheme is revertive therefore the CCM signal on the working path 220c is constantly monitored. If the CCM is restored, thus indicating recovery of the working path, then the traffic would return to the working path.

Figure 7:
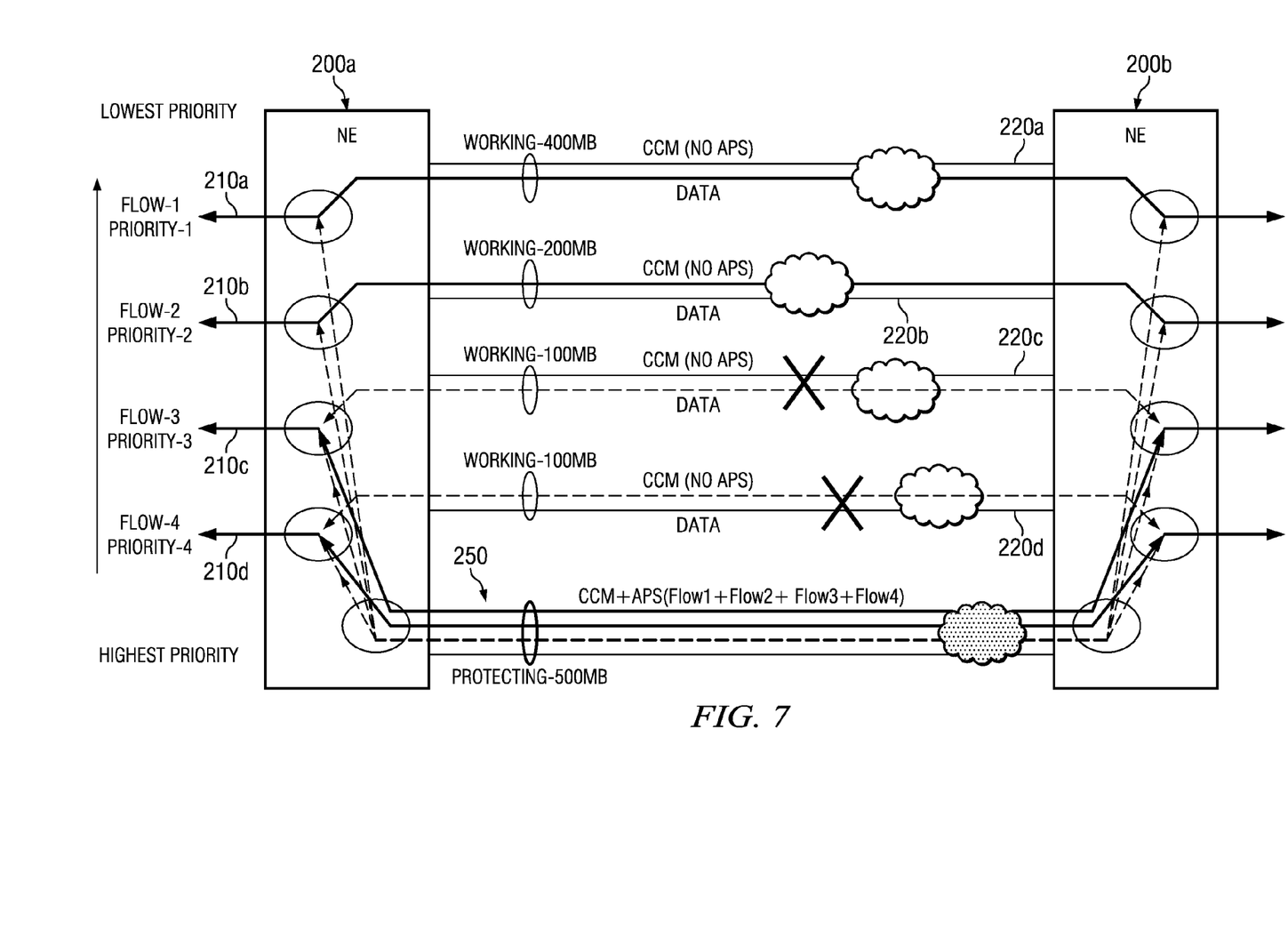
FIG. 7 is a block diagram illustrating the operation of the network of FIG. 3 when a second working path fails, according to a particular embodiment of the present disclosure.

FIG. 7 continues illustrating the example of the network of FIG. 6 when a second working path fails according to a particular embodiment of the present disclosure. As shown in FIG. 6, working path 220c has already failed and the flow 210c has been admitted to the protection path 250. In the example in FIG. 7, a failure now occurs in working path flow 220d as indicated by a loss of CCM signal. The FAM determines that working path 220d has 100 MB of bandwidth and the protection path has 400 MB of available bandwidth. Since the protection path bandwidth is sufficient (400 MB>100 MB), the FAM allows working path 220d to be admitted to the protection path 250 regardless of the priority. The FAM indicates to the SMM to initiate the switch of traffic from the failed working path to the protection path. The traffic switch occurs with the APS frames as described in FIG. 6. There is now 300 MB of available bandwidth on protection path 250.

Figure 8:
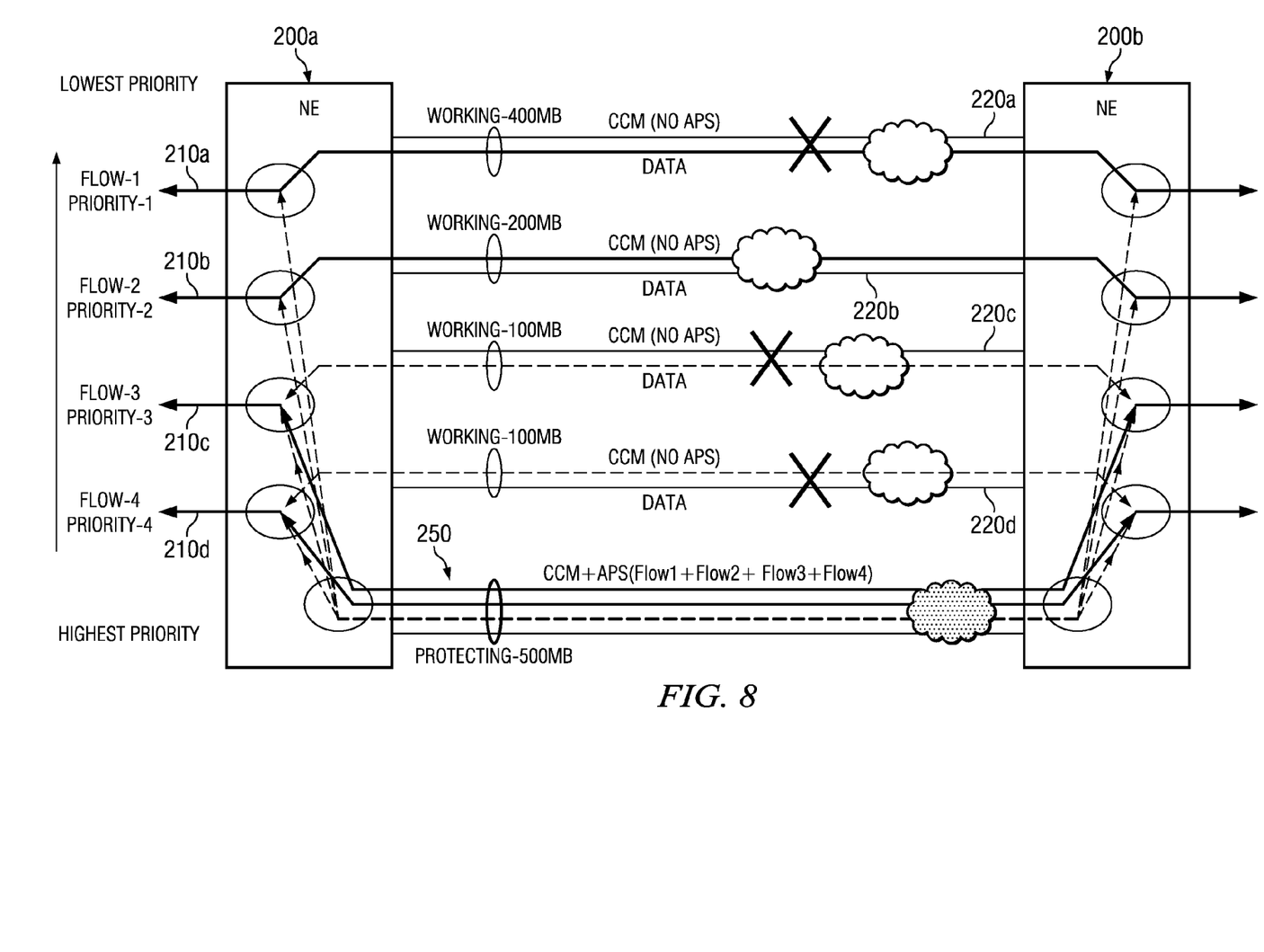
FIG. 8 is a block diagram illustrating the operation of the network of FIG. 3 when a third working path fails but its flow is not admitted to the protection path, according to a particular embodiment of the present disclosure.

FIG. 8 continues illustrating the example of the network of FIG. 6 when a third working path fails according to a particular embodiment of the present disclosure. As shown in FIGS. 6 and 7, working path 220c and working path 220d have already failed and been admitted to the protection path 250. There is 300 MB of available bandwidth on the protection path 250 when a loss of CCM signal indicates a failure occurred in working path 220a. The SMM sends a request to the FAM to switch. The FAM determines that working path 220a has a 400 MB bandwidth requirement which is larger than the available bandwidth (300 MB) of the protection path 250. The FAM compares the priorities of the traffic from working paths 220c, 220d and 220a and determines that the new failure on working path 220a has the lowest priority signal so it is not admitted to the protection path 250. The FAM denies the switch and places the working path failure in the pending state for the protection path. The SMM sends an APS frame between network elements 200a and 200b noting the denial in the "Request/State" field. In addition, the flow 210a from working path 220a is not transmitted during the time it is in the pending state. The protection architecture does not track or maintain any knowledge of the data while the working path is in the fail condition. The CCM signal may be monitored to determine whether the working path is repaired and monitor the availability of the protection path in order to create a link for data transmission.

Figure 9:
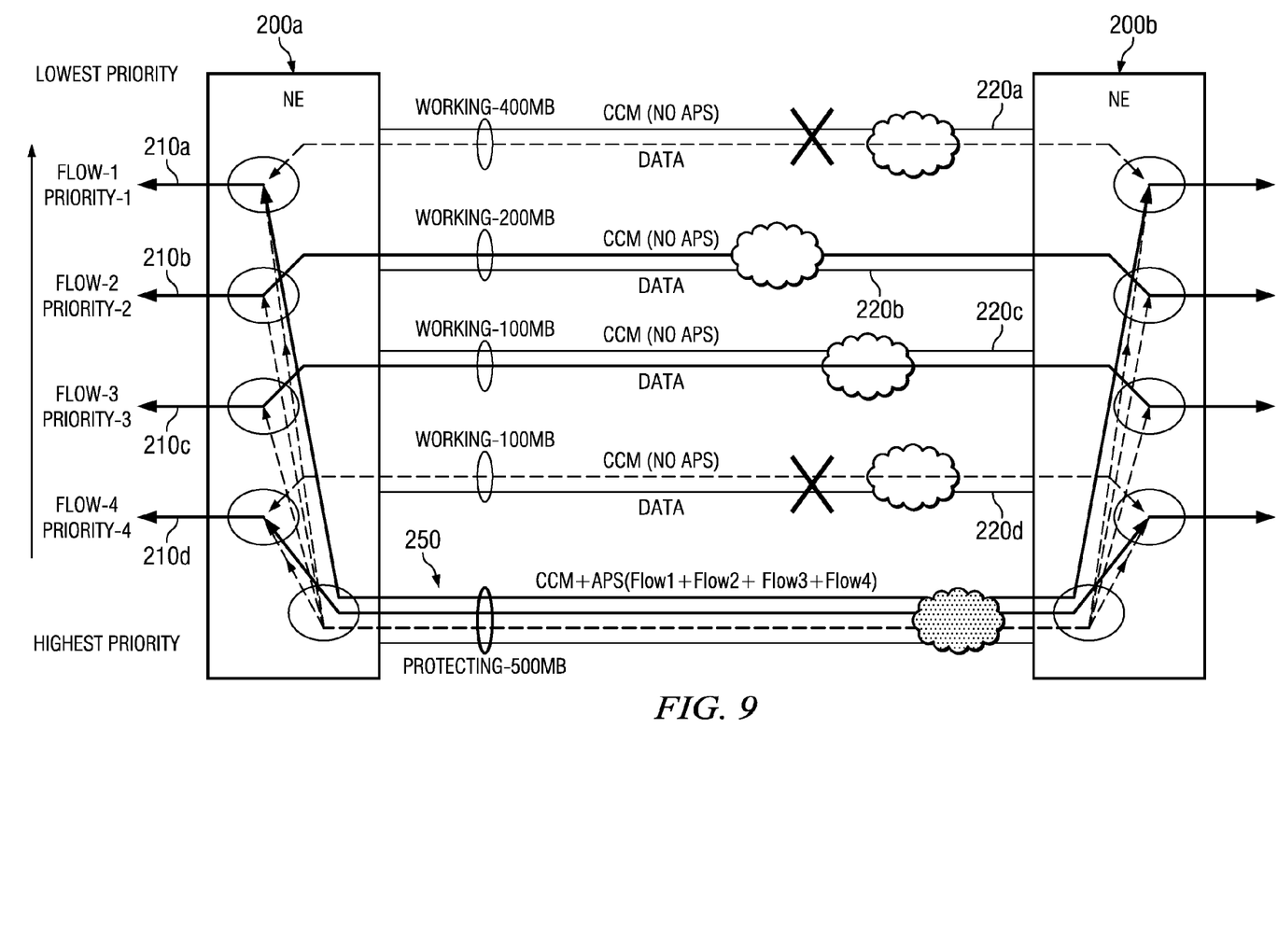
FIG. 9 is a block diagram illustrating the operation of the network of FIG. 3 when a working path recovers and a pending flow from a previous working path failure is admitted according, to a particular embodiment of the present disclosure.
Figure 10:
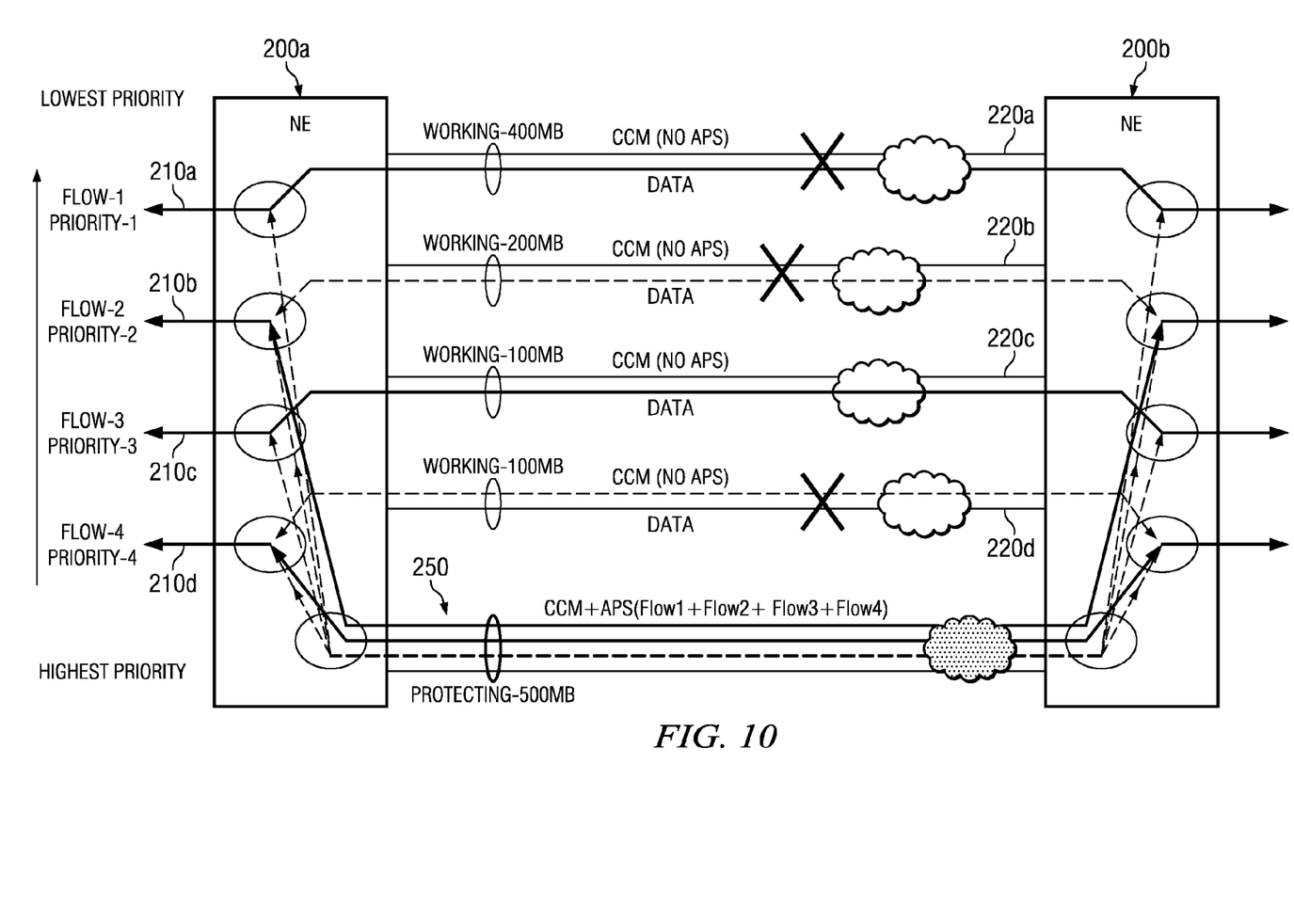
FIG. 10 is a block diagram illustrating the operation of the network of FIG. 3 when a working path with a higher priority flow fails and a lower priority flow is dropped, according to a particular embodiment of the present disclosure.

FIG. 9 continues illustrating the example of the network of FIG. 10 when a working path recovers and a pending flow from a previous failed working path is admitted to the protection path according to a particular embodiment of the present disclosure. As shown in FIGS. 6, 7 and 8, working path 220c and working path 220d have already failed and their flows, 210c and 210d respectively, have been admitted to the protection path 250. The flow's 210a admittance to the protection path 250 is pending due to insufficient bandwidth and lower priority. As discussed above, in this embodiment, the protection scheme is revertive therefore the CCM signal on the working path 220c may be constantly monitored. The FAM recognizes that working path 220c has recovered and communicates to the SMM to initiate the traffic switch back to the working path. The SMM sends an APS frame with "Wait to Restore" set in the "Request/State" field between network elements 200. Network element 200a sends an APS frame to network element 200b with the Requested Signal field set to zero. Network element 200b responds with an APS frame with the Bridged Signal and Requested Signal set to zero. Working path 220c is now transmitting flow 210c.

The FAM recalculates the available bandwidth on the protection path and determines that there is now 400 MB of bandwidth available. Prior to working path 220c recovering, there was 300 MB of available bandwidth on the protection path 250 and, since flow 210c required 100 MB of bandwidth, there is now 400 MB of bandwidth available on the protection path 250. The FAM determines that the pending data from working path 220a can now be admitted since there is sufficient bandwidth on the protection path and no other higher priority fails pending. Once flow 210a is admitted, there is zero bandwidth available on the protection path 250. The FAM notifies the SMM to begin switching the traffic of working path 220a to the protection path. The switch of flow 210a to the protection path 250 occurs as described in the figures above.

FIG. 10 continues illustrating the example of the network of FIG. 9 when a working path with a higher priority flow fails and a lower priority flow is dropped from the protection path according to a particular embodiment of the present disclosure. As shown in FIGS. 6-10, working path 220c and working path 220d have already failed and their respective flows have been admitted to the protection path 250. Working path 220a was pending until working path 220c recovered and then flow 210a was admitted to the protection path. There is zero available bandwidth when working path 220b fails as indicated by its CCM signal. The FAM determines that flow 210b has a higher priority than flow 210a which is already transmitting on the protection path. The FAM also determines that if flow 210a is dropped, there will be sufficient bandwidth for flow 210b. The FAM signals the SMM to initiate dropping flow 210a from the protection path 250 and admitting flow 210b. There is now 200 MB of available 500 MB bandwidth on the protection path 250 since flows 2+3+4 requires a total 200 MB+100 MB+100 MB=300 MB. The SMM initiates the APS mechanism and sends APS frames on the protection path 250 for working path 220a between network elements 200 with the appropriate bits in the "Request State" field set as described in the ITU-T G.8031 specification. The SMM notes that working path 220a is not functional so it will be in the pending state. Flow 210b will be admitted to the protection path with the APS handshaking mechanism described above.

Figure 11:
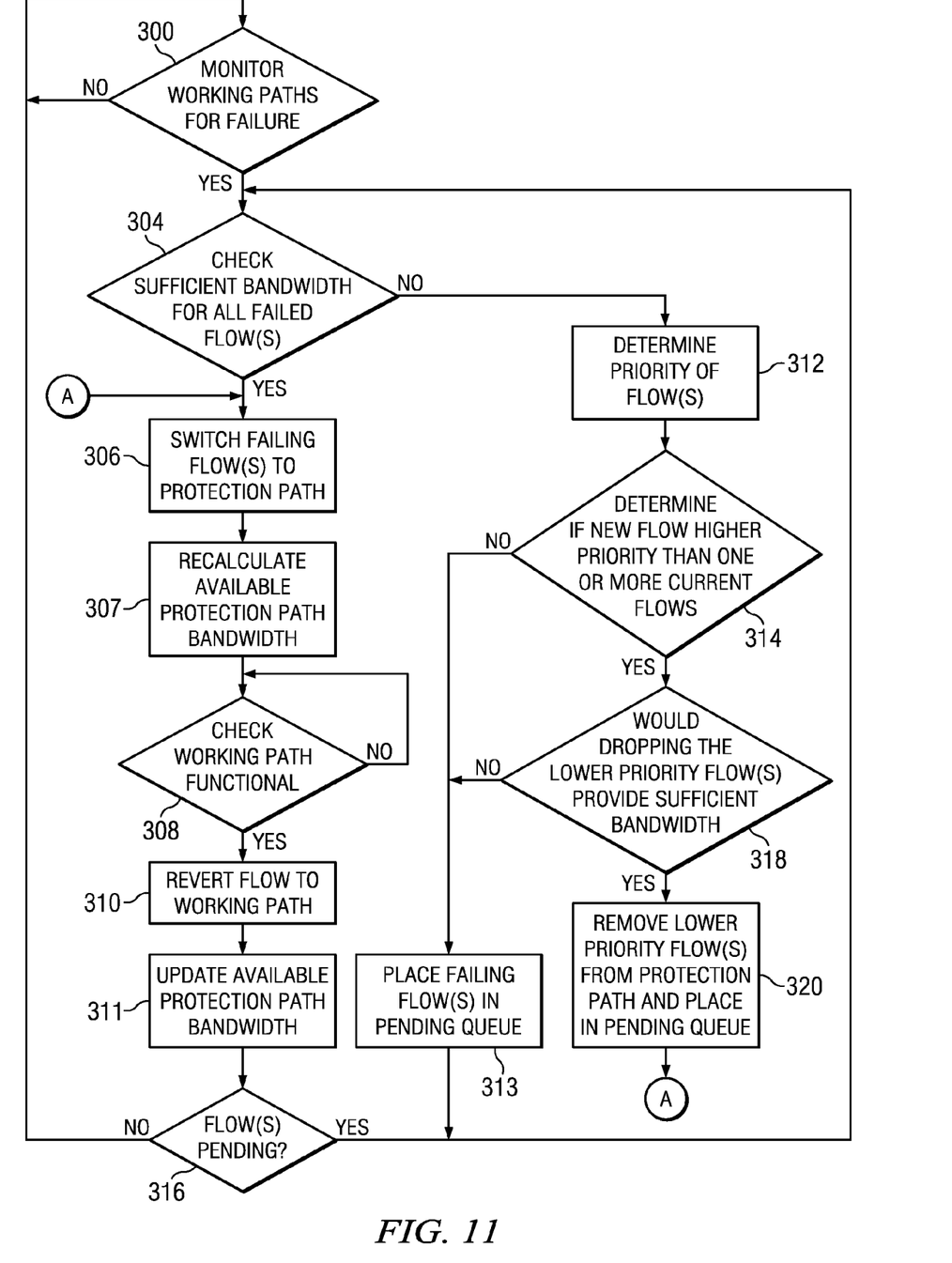
FIG. 11 is a block diagram illustrating an example method for protection switching, according to a particular embodiment of the present disclosure.

FIG. 11 is a block diagram illustrating an example method for protection switching, according to a particular embodiment of the present disclosure. In step 300, the working paths are functional and monitored periodically to determine if there is a failure. In step 304, if one or more failures have occurred there is a check for sufficient bandwidth. If there is sufficient bandwidth, then the flow(s) are switched to the protection path in step 306. In step 307, the available bandwidth on the protected path is recalculated. In step 308, the state of the failed working paths is monitored. If the failed path recovers, then the flow reverts back to the working path in step 310. In step 311, the amount of available bandwidth on the protected path may be updated. In addition at step 311, after the available bandwidth is updated, the pending flows will be checked in step 316. If there are pending flows in 316, then the process will continue at step 304. If there is not sufficient bandwidth in 304, then in step 312, the priority of the flows is determined. In step 314, if the newly failed flow is higher priority than one or more of flows currently on the protection path, determine in step 318 if dropping one or more of them provides sufficient bandwidth for the higher priority failed flow. If yes, then the lower priority failures are dropped in step 320 and placed in the pending queue to make room for the higher priority failed flow and the higher priority flow is switched to the protection path in step 306. If not, the current failure is in the pending state in step 313 and will be monitored in step 316 for admittance to the protection path. In addition at step 314, if the new failure is not higher priority than the current fails on the protection path, then the latest failure is pending in step 313 until sufficient bandwidth is available as determined in step 304.

Although FIG. 11 discloses a particular number of steps to be taken with respect to the method of implementing priority based Ethernet protection, the steps may be executed with more or fewer steps than those depicted in FIG. 11. In addition, although FIGS. 5 through 10 disclose a certain order of steps that may be taken with respect to the method implementing priority based Ethernet protection, the steps comprising the method of implementing priority based Ethernet protection may be completed in any suitable order.

Although the present disclosure has been described with several embodiments, various changes and modifications may be suggested to one skilled in the art. It is intended that the present disclosure encompass such changes and modifications as fall within the scope of the appended claims. For example, modifications, additions, or omissions may be made to the working paths, switches, signals and network described without departing from the scope of the disclosure.

What is claimed is:

1. A method for priority-based protection, comprising:
    assigning a priority to each of a plurality of flows associated with a plurality of working paths, wherein each of the plurality of the flows has a unique priority;
    determining that one or more of the working paths has failed;
    determining the available bandwidth on a protection path upon the failure of the one or more of the working paths;
    determining the priority of the flows on the one or more failed working paths; and
    switching two or more flows from the one or more failed working paths to the protection path based on at least the priority of the two or more flows, the bandwidth of the working path and the available bandwidth on the protected path.

2. The method of claim 1, further comprising dropping one or more of the flows from the protection path based on a newly failed working path having a higher priority flow and switching the newly failed flow to the protection path.

3. The method of claim 1, further comprising reverting one or more of the flows back to the one or more working paths upon recovery of the working path.

4. The method of claim 1, wherein the protection path bandwidth is less than the sum of the bandwidths of the plurality of working paths.

5. The method of claim 1, wherein assigning the priority of a flow comprises indicating the priority level associated with each flow in an Automatic Protection Switching (APS) frame communicated over the protection path.

6. The method of claim 5, wherein the protection path bandwidth is greater than the sum of the highest bandwidth of the flow and the bandwidth of the APS frame.

7. A communication network element comprising:
    a plurality of Ethernet ports coupled to a plurality of working paths carrying a plurality of flows and coupled to a protection path;
    a Configuration Module configure to:
        assign a priority to each of the plurality of flows;
    a Flow Admission Module (FAM) configured to:
        monitor the status of the plurality of working paths carrying the plurality of flows;
        determine the available bandwidth on a protection path upon the failure of the one or more of the working paths;
        determine the priority of the flows on the one or more failed working paths;
        determine which of the flows to switch to the protection path based at least on the priority of the flows and available bandwidth on the protection path; and
    an Automatic Protection Switching (APS) State Machine Module (SMM) configured to:
        indicate the priority assigned to each of the plurality of flows in an APS frame; and
        request switching of two or more flows from the one or more failed working paths to the protection path based on at least the priority of the two or more flows, the bandwidth of the working path and the available bandwidth on the protection path.

8. The network element of claim 7, wherein the FAM determines whether to drop one or more of the flows from the protection path based on at least the newly failed working path's flow having a higher priority.

9. The network element of claim 7, wherein the FAM determines whether to revert one or more of the flows back to one or more working paths upon recovery of the working path.

10. The network element of claim 7, wherein the SMM tracks the priority of the flows.

11. The network element of claim 7, wherein the status of the Ethernet port is indicated by a Continuity Check Message (CCM) signal.

12. A non-transitory computer-readable medium encoded with logic instructions executable by a processor to:
    assign a priority to each of a plurality of flows associated with a plurality of working paths, wherein each of the plurality of the flows has a unique priority;
    determine that one or more of the working paths has failed;
    determine the available bandwidth on a protection path upon the failure of the one or more of the working paths;
    determine the priority of the flows on the one or more failed working paths; and
    switch two or more flows from the one or more failed working paths to the protection path based on at least the priority of the two or more flows, the bandwidth of the working path and the available bandwidth on the protection path.

13. The non-transitory computer-readable medium of claim 12, wherein the logic instructions are further executable by a processor to drop one or more of the flows from the protection path based on at least the newly failed working path's flow having a higher priority.

14. The non-transitory computer-readable medium of claim 12, wherein the logic instructions are further executable by a processor to revert one or more of the flows back to one or more working paths upon recovery of the working path.

15. The non-transitory computer-readable medium of claim 12, wherein the protection path bandwidth is less than the sum of the bandwidths of the plurality of working paths.

16. The non-transitory computer-readable medium of claim 12, wherein assigning a priority of a flow comprises indicating the priority level associated with each flow in an Automatic Protection Switching (APS) frame communicated over the protection path.

17. The non-transitory computer-readable medium of claim 16, wherein the protection path bandwidth is greater than the sum of the highest bandwidth of the flow and the bandwidth of the APS frame.

* * * * *